Aug. 13, 1957     J. J. JAROSH ET AL     2,802,956

PENDULUM APPARATUS

Filed April 25, 1951

INVENTORS
JOSEPH E. PICARDI
JOHN J. JAROSH by Kenway Jenney Witter
& Hildreth
ATTORNEYS United States Patent Office 2,802,956
Patented Aug. 13, 1957

2,802,956
PENDULUM APPARATUS

John J. Jarosh, Brookline, Mass., and Joseph E. Picardi, Long Beach, Calif., assignors, by mesne assignments, to Research Corporation, New York, N. Y., a corporation of New York Application April 25, 1951, Serial No. 222,792

1 Claim. (Cl. 310—39)

The present invention relates to mechanical apparatus and is more particularly concerned with apparatus for detecting deviations from the vertical and measuring horizontal accelerations, and more particularly to long-period pendulums, useful for example in the navigational systems described in the copending applications of Draper, Hutzenlaub and Woodbury and of Draper and Woodbury, Serial Nos. 216,946 and 216,947, now Patents No. 2,752,793 and No. 2,752,792, respectively.

In control systems, it is often necessary to have an element which detects accelerations; especially in guidance systems is it useful to have a member sensitive to the gravity force. The most convenient means that suggests itself is a pendulum, but it has been found difficult so to construct a pendulum unit that it may be readily inserted in an electro-mechanical circuit with a convenient output, such as a shaft rotation or electric signal. Furthermore, the pendulum will react to spurious, short-period accelerations like propeller vibration.

It is the principal object of the present invention to provide a highly sensitive, yet rugged, pendulum unit suitable for use in such systems as well as in other circuits.

In furtherance of this and other objects as will hereinafter appear, one of the principal features of the present invention is the limitation of the pendulum movement to a single degree of freedom.

Another feature of the present invention is the provision of means for damping rotations of the pendulous mass, so as to smooth the output. A further feature is that the damping member is constructed in such a way that the viscous fluid also provides a buoying force in the vertical direction, greatly reducing the force on the bearings, and, consequently, the friction. The damping provided is considerably greater than the critical damping for the pendulum. This enables the pendulum to act as an integrator in certain special applications.

Another feature of the present invention is the provision of means for converting pendulum deflections immediately into appropriate voltages by attaching a signal generator directly to the output shaft of the pendulum unit. A similar feature is the inclusion of torque-generating means for applying control torques tending to twist the pendulum away from the vertical by means of an electric signal.

Figure 1:
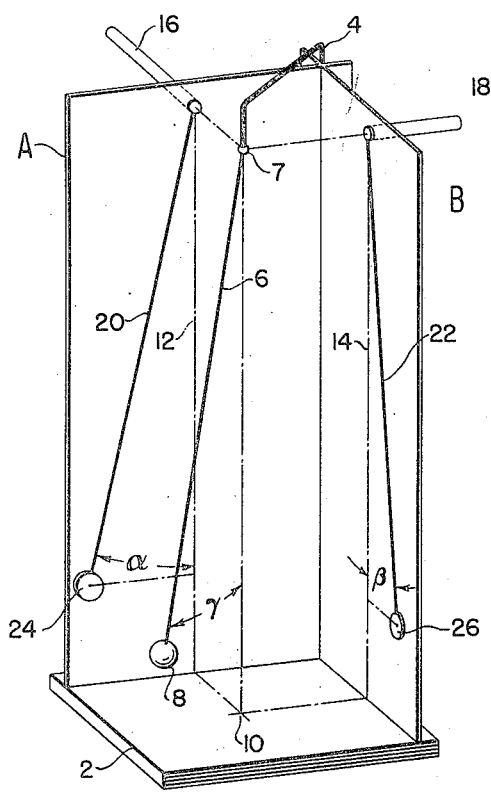
Figure 2:
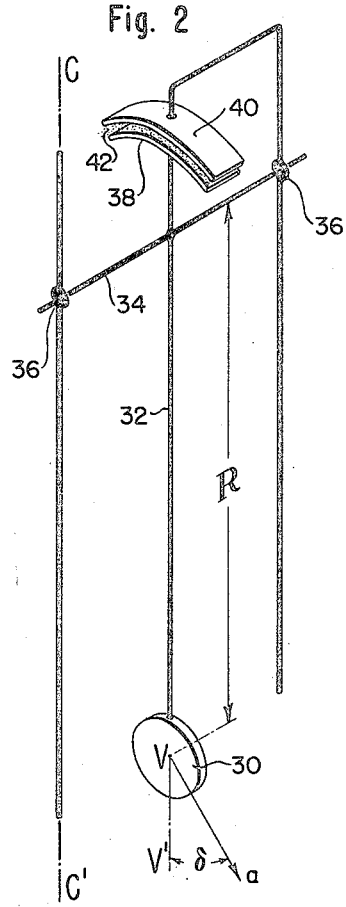
Figure 3:
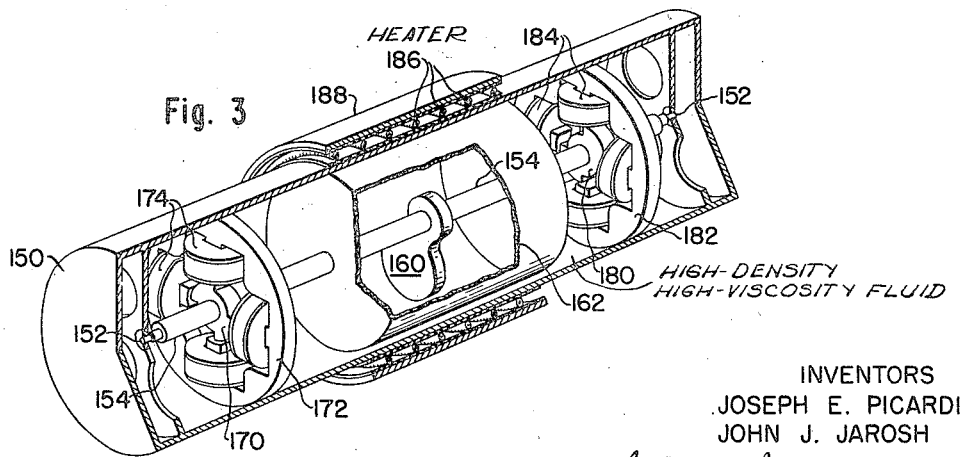

In the accompanying drawings, Figs. 1 and 2 are schematic drawings to show the operation of two of the features of the invention; Fig. 3 is a cutaway view of a preferred embodiment of the invention.

Fig. 1 illustrates the theory of limiting the pendulum to a single degree of freedom. A base 2 is shown, carrying the support 4 and the pivot 7 which in turn carries a two-degree-of-freedom pendulum with a bob 8 and supporting cord 6. In its steady-state condition the line of the cord 6 will be the line of the vertical. If the base 2 is held horizontally this line will pass through the equilibrium point 10. If, however, the base 2 is tipped the pendulum will deflect an angle $\gamma$ as shown in Fig. 1. Consider, then two planes A and B at right angles to each other but bearing no particular relation to the pendulum assembly 6 and 8. It can be seen that the equilibrium line of the cord 6 can be projected on these planes, as shown at 12 and 14. Furthermore, if the two-degree-of-freedom pendulum deflects, its deflection can be resolved into two angular components $\alpha$ and $\beta$, in the planes A and B, whose vector sum will be the angular deflection $\gamma$ of the bob 8. Instead of the imaginary planes A and B, the shafts 16 and 18 are supplied; and rigidly mounted to them are two pendulums with rods 20 and 22 and bobs 24 and 26. Thus, these pendulums are constrained to swing only in the planes A and B. If the base 2 is tipped, all three pendulums will deflect. Since the bob 24 is unaffected by forces normal to plane A, it will swing an angle determined by the sum of the forces acting parallel to the plane A, and likewise, the bob 26 will react only to forces parallel to the plane B. The deflection of the bob 8 will be due to the vector sum of those forces and hence the deflections of the bobs 24 and 26 represent the right-angle components of the deflection of the two-degree-of-freedom pendulum. The motion of the base 2 from the horizontal is then completely described by two shaft rotations which can be read from a dial or converted to electrical outputs by servomechanisms. The deviation is already split into right-angle components which permits of separate channels for, say, roll and pitch control, or, if components are not desired, their vector addition is readily accomplished by conventional means. For the cumbersome assembly of the two-degree-of-freedom pendulum two simple single-degree-of-freedom pendulum units have been substituted.

Fig. 2 shows a schematic diagram of a damped single-degree-of-freedom pendulum unit. A pendulum bob 30 is attached to a rod 32 which is in turn rigidly connected to a shaft 34, free to rotate in its bearings 36. A reference axis to the pendulum shaft support is indicated at C—C' corresponding to the vertical V—V'.

There are in general a number of random short-period accelerations acting on the pendulum bob. Let their sum be denoted by $a$ and their resultant angle with respect to the line of the pendulum rod 32 be $\delta$. They will cause the pendulum bob 30 to exert a reaction torque about the shaft 34 which will be denoted by $T_\gamma$.

$$T_\gamma = (R \sin \delta) ma \qquad (1)$$

where R is the distance between the center of gravity of the bob and the axis of rotation and $m$ is the mass of the bob. For small $\delta$ this may be written:

$$T_\gamma = (R\delta) ma = K\delta a \qquad (2)$$

where K is a constant.

In order to resist the reaction torque, a damping means is included in the unit. A rotor (shown schematically at 38) and a stator (shown schematically at 40) with a viscous fluid 42 between them are provided. The rotor is attached to the shaft 34 and the stator 40 to the case and bearings. The damping means will generate a resisting torque $T_d$ proportional to the angular velocity of the shaft 34 with respect to the case:

$$T_d = C \frac{d\theta}{dt} \qquad (3)$$

where $\theta$ is the angular displacement of the pendulum with respect to its case and C is the damping coefficient. For equilibrium, $$T_d = T_\gamma = C \frac{d\theta}{dt} \qquad (4)$$

upon integrating, $$\theta = \frac{1}{C} \int T_\gamma dt \qquad (5)$$

The pendulum acts as an integrator of its own input torques. However, since $T_\gamma$ depends on $\delta$ which will decrease as $\theta$ increases, the device is only an integrator for accelerations whose period is short with respect to the pendulum period. In the preferred embodiment the damping applied is such as to give the pendulum a period of about 15 seconds. Hence, such a pendulum will act as an integrator for accelerations with periods less than about two seconds. This has the effect of eliminating or averaging from the pendulum output such short-period accelerations as propeller vibration or momentary pitch, roll or yaw.

A pendulum unit that incorporates these features is shown in Fig. 3. The unit is contained in the cylindrical case 150, and consists of three sections, the pendulous mass with associated damping, the signal generator and the torque generator. Torques are summed about the shaft 154 which is mounted in jeweled bearings shown at 152. For the sake of accuracy it is desirable to have bearing friction as low as possible. The pendulous mass is at 160 rigidly attached to the shaft 154; it should be noted that it need be of no particular shape so long as there is a moment distance between its center of mass and the center of rotation in the shaft 154. Surrounding the pendulous mass and rigidly attached to the shaft 154 is the float 162. Thus, when the shaft 154 is rotated, the float is also. The float is of dimensions such that the clearance between it and the case 150 is very small, of the order of a few thousandths of an inch. The case is filled with a high-density, high viscosity fluid (indicated by legend in Fig. 3), which supplies the damping. The fluid fills the space between the float and the case and therefore gives rise to a viscous shear force when the float (i. e., the shaft 154) is rotated. Furthermore, because the float 162 is totally immersed in the fluid there is a buoyant force exerted on it which counterbalances the weight, thereby largely removing the weight force from the bearings 152. In practice, the weight force on the bearings may be about a kilogram; the relation of float and buoying fluid may be arranged to reduce the force on the bearings to one gram. The fluid serves another purpose; if the pendulum is to be mounted in a vehicle, such as an aircraft, as will usually be the case, the unit will be subjected to jolts and sudden accelerations which would cause sizable reaction forces on the bearings 152. The fluid acts as a cushion, transmitting these reaction forces to the case 150 directly, by-passing the bearings. This permits the more delicate types of frictionless bearings to be used.

The second section of the pendulum unit comprises a signal generator, preferably of the type described in U. S. Patent No. 2,488,734 of Mueller, November 22, 1949. Such a signal generator comprises a rotor, shown at 170, rigidly attached to the shaft 154, and a stator 172 mounted on the case 150. Windings 174 are provided on the stator. A reference voltage applied to the windings produces an output voltage whose magnitude is proportional to the angle between the rotor and its neutral position with respect to the stator, as described in the above-mentioned patent. Thus, an electrical measure of the pendulum deflection is provided.

This is useful in stabilization apparatus wherein it is desirable to make some stabilized member insensitive to accelerations normal to the vertical. This may be done by integrating the angular deflection of a pendulum twice with appropriate sensitivities and a specified type of damping in the system. This integration is most easily performed electrically and therefore it is desirable to have an electrical quantity which represents the angular deflection of the pendulum. The present pendulum unit includes means for obtaining such an electrical output. It should be understood that the present invention is not limited to the Mueller signal generator; any device which produces an electrical output dependent on the position of the shaft 154 with respect to the case 150 may be used.

The third section of the pendulum unit is the torque generator which is of the type described in the above-mentioned Mueller patent. Its physical configuration is the same as that of the signal generator; there is a rotor 180 mounted on the shaft 154 and a stator 182 attached to the case 150 with stator windings 184. The torque generator produces a torque on the shaft 154 which is proportional to the current input to the stator windings and independent of the relative position of the rotor and stator. The torque generator enables the pendulum to be twisted away from the vertical. This is useful in certain operations. For example, a pendulum unit of this type is useful in an autopilot, to stabilize the aircraft from variations in pitch. In such a case, the pendulum would be mounted with the shaft 154 parallel to the axis of the wings, and the aircraft would be stabilized to the horizontal about the pitch axis as indicated by the pendulum. By applying a torque to the pendulum by means of the torque generator, a simple potentiometer control enables the pilot to cause the aircraft to go up or down and the removal of the input current will cause it to be stabilized to the horizontal again by the pendulum.

A heater is provided by placing heating coils about the case of the unit as shown at 186, shielded and supported by the member 188, which may be made of an insulating material. This heater is used to keep the damping fluid at a constant temperature so there will be no variation in the damping coefficient. It has been found best to keep the fluid at a temperature well above surrounding air temperature, say, 150° F., for ease in control. It is most convenient to do this by means of a conventional thermostatic control mounted on the shield member 188. Baffles may be provided to keep the temperature-controlled fluid in the clearance between the float 162 and the case from mingling with the relatively uncontrolled fluid in the rest of the case volume.

Having thus described our invention, we claim:

A pendulum unit comprising an outer cylindrical case, an inner cylindrical casing forming a pendulum chamber, a shaft centrally secured to the inner casing, a pendulous mass secured with respect to the casing for pivotal motion of the casing and pendulous mass about the axis of the shaft, bearings in the outer case, an electrical signal generator having a part fixed in the outer case and a part mounted on the shaft, the outer case and inner casing being separated by a small annular clearance space, and a liquid filling the case and of a density to substantially float the inner casing with its shaft and pendulous mass, said liquid being of a viscosity to provide a substantial viscous shear force upon relative rotation between the inner casing and the outer case.

References Cited in the file of this patent

UNITED STATES PATENTS

| | | |
|---|---|---|
| 1,589,039 | Kaempfe | June 15, 1926 |
| 1,607,881 | Dunlea | Nov. 23, 1926 |
| 1,668,809 | James | May 8, 1928 |
| 1,831,587 | Henderson | Nov. 10, 1931 |
| 1,957,897 | Micek | May 8, 1934 |
| 2,002,911 | Mendenhall et al. | May 28, 1935 |
| 2,084,479 | Coberly | June 22, 1937 |
| 2,488,734 | Mueller | Nov. 22, 1949 |
| 2,585,024 | Lundberg | Feb. 12, 1952 |
| 2,595,268 | Kellogg | May 6, 1952 |
| 2,598,672 | Braddon et al. | June 3, 1952 |
| 2,618,159 | Johnson et al. | Nov. 18, 1952 |